United States Patent [19]

Webb

[11] Patent Number: 5,723,842
[45] Date of Patent: Mar. 3, 1998

[54] ABOVE-GROUND FIRE-RESISTANT STORAGE TANK SYSTEM AND FABRICATION METHOD

[75] Inventor: R. Michael Webb, Eau Claire, Wis.

[73] Assignee: U-Fuel, Inc., Eau Claire, Wis.

[21] Appl. No.: 590,077

[22] Filed: Jan. 17, 1996

[51] Int. Cl.⁶ ..................................................... B23K 9/18
[52] U.S. Cl. ........................ 219/73; 219/126; 219/137 R; 220/612
[58] Field of Search ..................... 219/126, 73, 137 R; 220/612

[56] References Cited

U.S. PATENT DOCUMENTS

| 2,638,524 | 5/1953 | Meyer | 219/73 |
| 3,883,711 | 5/1975 | Fischer et al. | 219/73 |
| 5,035,926 | 7/1991 | Webb | 222/183 |

OTHER PUBLICATIONS

UL 142 Standard for Steel Aboveground Tanks for Flammable and Combustible Liquids, Underwriters Laboratories, 1993.

"Insulated Aboveground Tanks for Flammable Liquids"—UL 2085, Dec. 27, 1994.

"Automotive and Marine Service Station Code", p. 30A–8, Section 2–4.5.

Griffing, Len, ed., Welding Handbook, Sixth Edition, Section Four, Metals and their Weldabilty, 1972, pp. 63.1–63.5.

Lyman, Taylor, ed. Metals Handbook, 8th Edition, vol. 6, Welding and Brazing, 1971, pp. 49–50.

*Primary Examiner*—Clifford C. Shaw
*Attorney, Agent, or Firm*—Woodcock Washburn Kurtz Mackiewicz & Norris

[57] ABSTRACT

An improved fire-resistant above-ground storage tank for flammable and combustible materials is fabricated from steel plates of at least 10 gauge, the sheets being made from a ferrous alloy having a maximum of approximately 0.15% carbon and a maximum of approximately 0.8% manganese and the steel plates welded in a specific way resulting in a tank that can withstand a 2000° F. environment for a minimum of two hours.

14 Claims, 4 Drawing Sheets

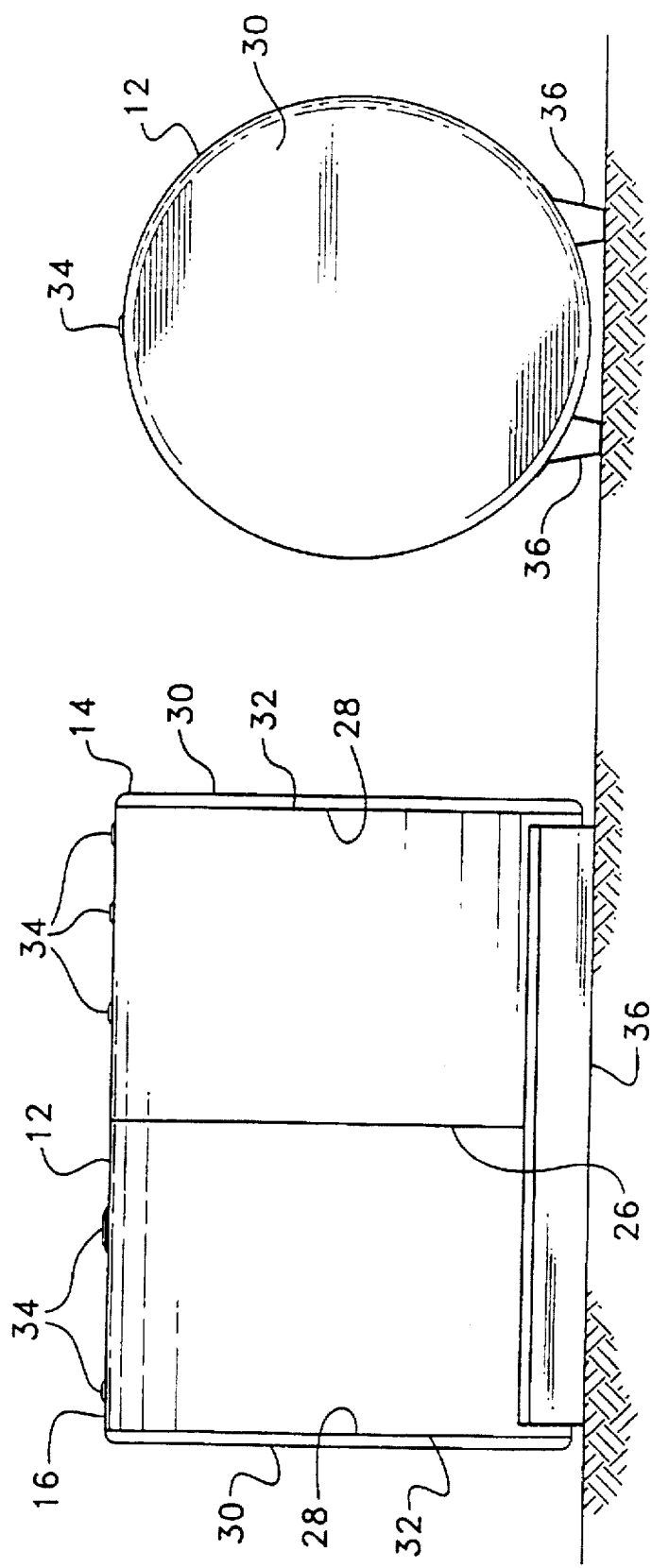

ABOVE-GROUND FIRE-RESISTANT STORAGE TANK SYSTEM AND FABRICATION METHOD

BACKGROUND OF THE INVENTION

1. Field of the Invention

The present invention relates to an above-ground fire-resistant tank system for flammable and combustible material. More specifically, the invention relates to a tank, fabricated from a specific metal of a minimum thickness which is welded in a specific manner, which can withstand 2000° F. environment for a minimum of two hours.

2. Description of the Prior Art

Numerous applications exist for above-ground tanks for flammable and combustible materials, i.e. gas stations, airports, and construction sites. In all these applications, and more, tanks storing flammable and combustible materials have a potential for fire and explosion, which should obviously be minimized. It has been determined that the risk is sufficiently minimized when a tank can withstand a 2000° F. environment for two hours, as per Underwriters Laboratories test procedure 2085.

A number of different designs of above-ground fire-resistant tanks have been developed which meet the Underwriters Laboratories test procedures. One type of tank is encased in a thickness of cement, which increases the cost of a tank. Besides the economic penalty of adding another component to the tank, the cement is a minimum six inches thick which decreases its maneuverability. Another design requires constructing a storage tank, surrounding the storage tank with insulation, and constructing a secondary containment tank around the insulation. The insulation adds material cost to the tanks and increases the construction labor costs.

It is clear that there has existed a long and unfilled need in the prior art for an above-ground fire-resistant tank for flammable and combustible liquids which does not require additional components in order to withstand 2000° F. for two hours.

SUMMARY OF THE INVENTION

Accordingly, is it an object of the invention to provide a fire-resistant above-ground tank system for storing flammable and combustible material, such as gasoline, by fabricating a tank from steel plates of at least 10 gauge, the steel having a maximum of approximately 0.15% carbon and a maximum of approximately 0.8% manganese. The plates being welded together either with joggle joints or butt weld joints. Further, at least one of the welds contains weld metal having a maximum of approximately 0.15% carbon and a maximum of approximately 1.4% manganese. The tank system contains tank fittings to transfer material into and out of the tank.

It is a further object to provide a double-wall fire-resistant above-ground tank system for storing flammable and combustible material, such as gasoline, by fabricating a product storage tank from steel plates of at least 7 gauge and nesting the storage tank within a secondary containment tank fabricated from steel plates of at least 10 gauge. Both tanks being made out of steel plates having a maximum of approximately 0.15% carbon and a maximum of approximately 0.8% manganese. The plates being welded together either with joggle joints or butt weld joints. Further, at least one of the welds contains weld metal having a maximum of approximately 0.15% carbon and approximately 1.4% manganese.

It is another object to provide a method to fabricate a fire-resistant above-ground tank system for storing flammable and combustible material, such as gasoline, by fabricating a product storage tank of at 10 gauge steel plates. The steel having a maximum of approximately 0.15% carbon and a maximum of approximately 0.8% manganese. The plates being welded together either with joggle joints or butt weld joints. The welds are made either using a submerged arc welder at 225 to 280 amps with L 61 wire and 761 flux or a hot gas metal arc welder with the gas shield being carbon dioxide, the wire feed being an AWS E71T-1 class, titania type flux cored wire designed for use with 100% carbon dioxide gas shielding, the wire having a maximum of approximately 0.15% carbon and a maximum of approximately 1.4% manganese, and the amperage used during welding is 180 to 220 amps. The tank system contains tank fittings to transfer material into and out of the tank.

It is another object to provide a method to fabricate a fire-resistant above-ground tank system for storing flammable and combustible material, such as gasoline, by fabricating a double wall tank with an inner product storage tank made from steel plates of at least 7 gauge and an outer secondary containment tank made from steel plates of at least 10 gauge. The steel for both tanks having a maximum of approximately 0.15% carbon and a maximum of approximately 0.8% manganese. The plates being welded together either with joggle joints or butt weld joints. The welds are made either using a submerged arc welder at 225 to 280 amps with L 61 wire and 761 flux or a hot gas metal arc welder with the gas shield being carbon dioxide, the wire feed being an AWS E71T-1 class, titania type flux cored wire designed for use with 100% carbon dioxide gas shielding, the wire having a maximum of approximately 0.15% carbon and a maximum of approximately 1.4% manganese, and the amperage used during welding is 180 to 220 amps. The tank system contains tank fittings to transfer material into and out of the tank.

In order to achieve the above and other objects of the invention, an above-ground fire-resistant storage tank system for storing combustible material, such as gasoline, is fabricated from steel plates of a minimum thickness, the sheets being made from a special metal alloy, and the plates welded in a specific way, in order to withstand a 2000° F. environment for a minimum of two hours.

BRIEF DESCRIPTION OF THE DRAWINGS

FIG. 2 illustrates an elevation of a single wall tank;

FIG. 3 illustrates an end view of a single wall tanks;

FIGS. 7 and 8 illustrate a butt weld joint and a joggle joint, respectively.

DETAILED DESCRIPTION OF THE PREFERRED EMBODIMENTS

Figure 1:
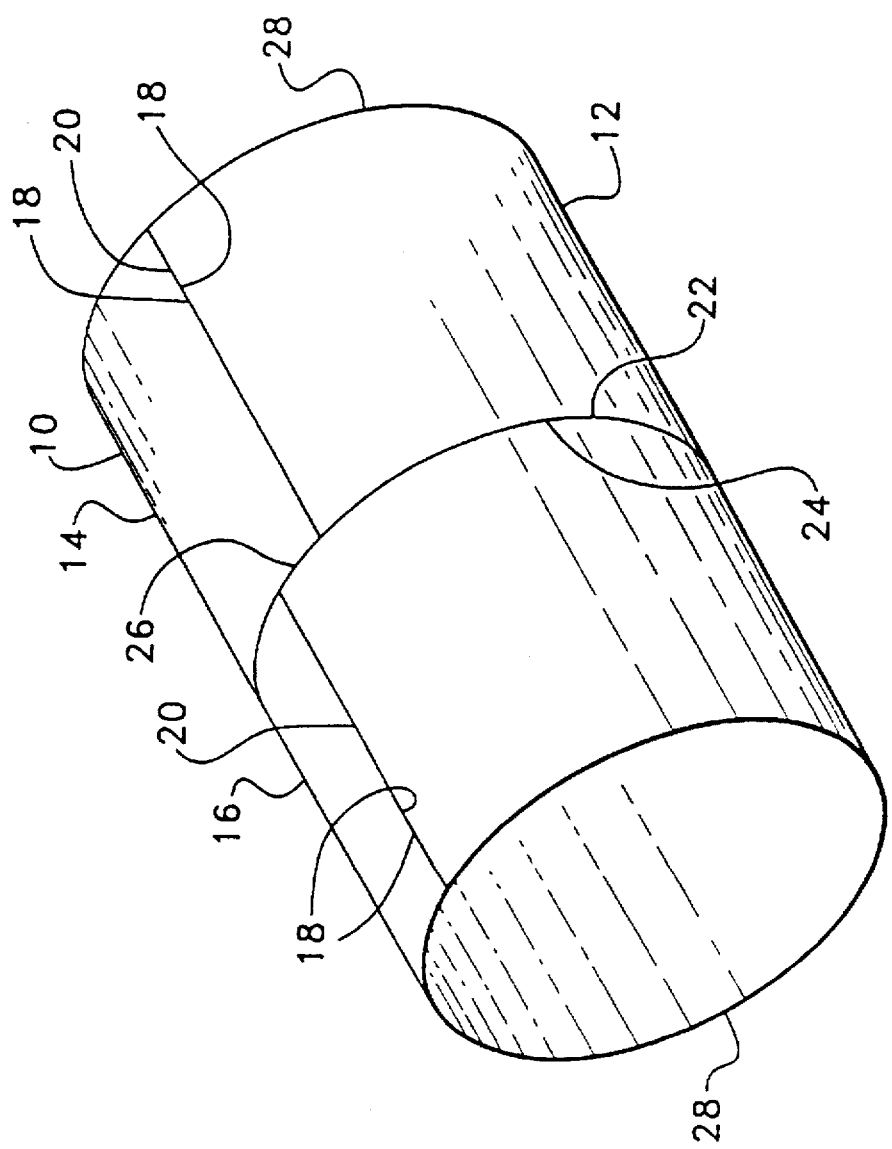
FIG. 1 illustrates a perspective view of a single wall tank lacking end panels.

Referring to FIG. 1, cylindrical wall 10 of single wall storage tank 12 is comprised of rolled metal sheet 14 and rolled metal sheet 16. Both rolled metal sheets 14 and 16 are formed by cutting a rectangular piece of metal and rolling the metal until two opposite butted ends 18 come together to form a ring. Butted ends 18 are welded together by weld joint 20. Rolled metal sheet 14 has a joggle joint rolled end 22 and an outside end 28. The formation of a joggle joint rolled end 22 is discussed below. Rolled metal sheet 16 has an inside end 24 and an outside end 28. When rolled metal sheets 14 and 16 are assembled, joggle jointed rolled end 22 is welded to inside end 24, thus forming joggle joint 26. Attention is drawn to the non-alignment of butt-welded joints 20 of rolled metal sheets 14 and 16. The purpose of non-alignment of butt-welded joint 20 is to increase the strength of single wall storage tank 12.

Rolled metal sheets 14 and 16 are comprised of a special ferrous alloy which provides fire-resistant support to single wall storage tank 12. The ferrous alloy has a maximum of approximately 0.15% carbon and a maximum of approximately 0.8% manganese. The maximum limits on carbon and manganese is to limit the brittleness of the alloy. A brittle alloy will not as effectively withstand the stresses placed on the tank when exposed to an elevated temperature. In the preferred embodiment, the ferrous alloy also has a maximum of approximately 0.04% phosphorous, and a maximum of approximately 0.05% sulfur. Attention is drawn to the fact that this ferrous alloy composition is not a standard composition. The closest structural grade steel available to this composition is ASTM A 36, which has a carbon percent maximum of approximately 0.25%.

Referring now to FIGS. 2 and 3, an assembled single wall storage tank 12 is comprised of cylindrical wall 10 and storage tank end panels 30. Storage tank end panels 30 are cut from the same metal as used for rolled metal sheets 14 and 16. Storage tank end panels are cut and flanged and attached to outside ends 28 forming joint 32. In the preferred embodiment, joints 32 are joggle joints.

The thickness of rolled metal sheets 14 and 16 and storage tank end panels 30 are based on the size of the tank. Table I, Plate Thickness Chart for Single Wall Fire-Resistant Tanks, lists the plate thickness for various size tanks. The thickness of the steel is critical to the invention. When the tank is heated to over 1000° F., the outside of the steel becomes porous forming a protective "skin." As a result, the steel sheet must be thick enough and be of a consistent quality to allow the "skin" to form and have enough mass to support the skin and to provide maintain the integrity of single wall storage tank 12. Further, the thickness affects the performance of the assembly when exposed to high temperatures by allowing for increased expansion without fatal stresses that result in tank rupture.

TABLE I

Single Wall Fire-Resistant Tanks
Plate Thickness Chart

| Gallons | Size | Plate Thickness |
| --- | --- | --- |
| 300 | 38" × 5' | 10 ga. |
| 550 | 48" × 6' | 10 ga. |
| 1,000 | 48" × 12' | 10 ga. |
| 1,000 | 64" × 6' | 10 ga. |
| 2,000 | 64" × 12' | 7 ga. |
| 3,000 | 64" × 18' | 7 ga. |
| 4,000 | 64" × 24' | 7 ga. |
| 5,000 | 8' × 14' | 1/4" |
| 6,000 | 8' × 16' | 1/4" |
| 8,000 | 8' × 21' | 1/4" |
| 10,000 | 8' × 27' | 1/4" |
| 10,000 | 9' × 21' | 1/4" |
| 12,000 | 9' × 25' | 1/4" |
| 15,000 | 9' × 32' | 1/4" |
| 20,000 | 10' × 34' | 1/4" |
| 30,000 | 10' × 51' | 1/4" |

Single wall storage tank 12 also comprises welded couplings 34 and tank skids 36. FIGS. 2 and 3 depict couplings 34 on the top of single wall storage tank 12. However, couplings can be placed where desired, depending on the application for which single wall storage tank 12 is used.

Tank 12 is supported by skids 36. In the preferred embodiment, there are two skids 36 which run longitudinally on the bottom of single wall storage tank 12. Skids 36 on single wall storage tank 12 perform multiple functions. Skids 36 stabilize the tank 12 during its normal use. Skids 36 provide structural support to single wall storage tank 12 as the temperature of the tank increases and the "skin" develops. The structural strength of single wall storage tank 12 diminishes as the temperature of the tank increases beyond 1000° F. Skids 36 help give structural support to the steel in this temperature range. In the preferred embodiment, skids 36 have a similar coefficient of expansion as tank 12, thereby expanding at a similar rate as tank 12 when exposed to elevated temperatures, further reducing the chance of tank rupture.

Figure 4:
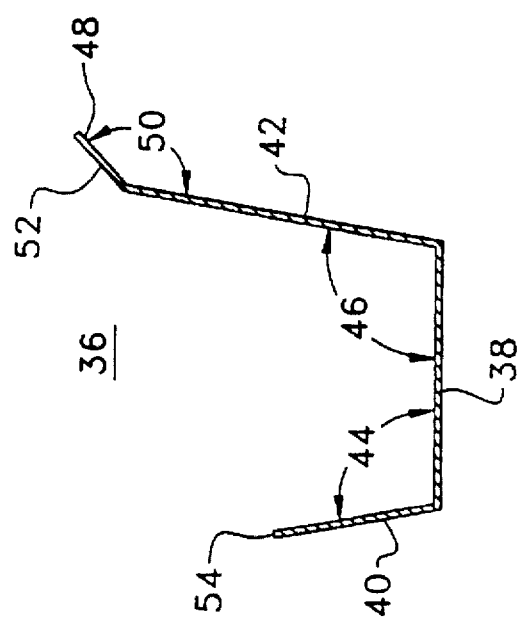
FIG. 4 illustrates an end view of a skid.

Now referring to FIG. 4, skid 36 has a generally u-shaped cross section comprising a base 38, short vertical member 40, and tall vertical member 42. Generally, skid 36 is designed such that single wall storage tank 12 rests on both short vertical member 40 and tall vertical member 42, as is shown in FIG. 3. Short vertical member 40 is at an angle 44 from base 38. In the preferred embodiment, angle 44 is approximately 100°. Similarly, tall vertical member 42, which is taller than short vertical member 40, is at an angle 46 from base 38. In the preferred embodiment, angle 46 is approximately 100°. Extending from the top of tall vertical member 42 is tank resting element 48. Tank resting element 48 is a band of metal which extends the entire length of tall vertical member 42. Tank resting element 48 makes angle 50 with the outside surface of tall vertical member 42. In the preferred embodiment, angle 50 is approximately 142°. Tank resting element 48 has an upper surface 52, which, along with edge 54 of short vertical member 40, comprises the two points upon which single wall tank 12 rests. This configuration of skids 36 allows two parallel skids to be placed equally distant from the center of single wall tank 12 and supports single wall tank 12.

Figure 5:
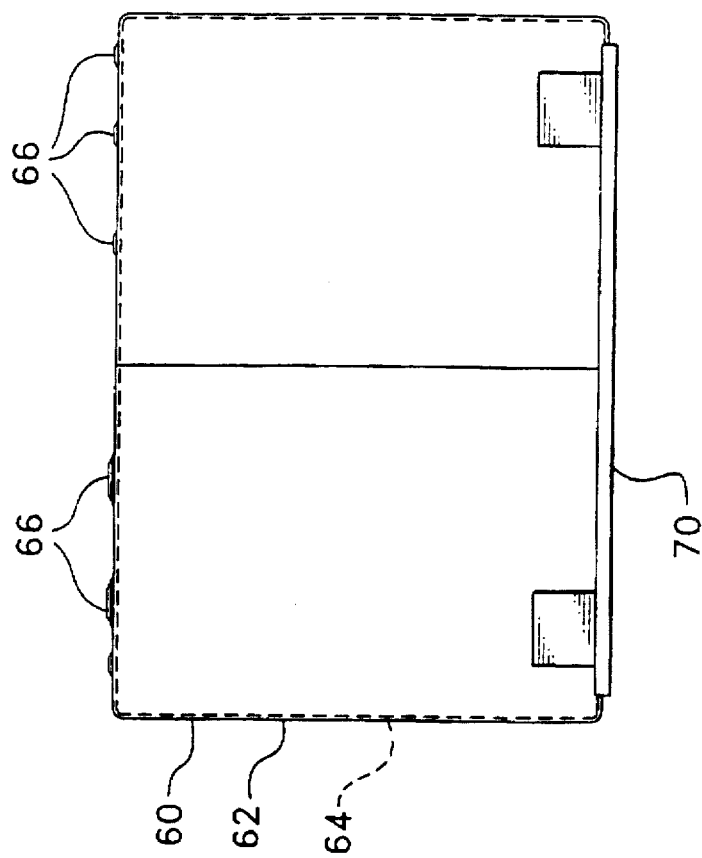
FIG. 5 illustrates an elevation of a double wall tank.

Referring to FIG. 5, double wall storage tank 60 is comprised of a secondary containment tank 62 and a product storage tank 64. Double wall storage tank 60 is fabricated in the same manner as single wall storage tank 12, except that product storage tank 64 is nested inside secondary containment tank 62. In the preferred embodiment, the diameter of secondary containment tank 62 is a half inch larger than the diameter of product storage tank 64. Additionally, secondary containment tank 62 has a length which is four inches longer than the length of product storage tank 64. These differences in diameter and length allow for expansion and contraction without rupturing either secondary containment tank 62 or product storage tank 64. Additionally, the chance of tank rupture caused by thermal expansion is reduced by fabricating secondary containment tank 62 and product storage tank 64 from metal sheets having similar coefficients of expansion, so that both tanks expand at similar rates when exposed to elevated temperatures.

In order to maintain structural integrity during elevated temperatures, the walls of both secondary containment tank 62 and product storage tank 64, which are listed on Table II, Plate Thickness Chart of Double Wall Fire Resistant Tanks.

TABLE II

Double Wall Fire-Resistant Tanks
Plate Thickness Chart

| | | Plate Thickness | |
|---|---|---|---|
| Gallons | Size | Product Storage Tank | Secondary Containment Tank |
| 300 | 38" × 5' | 7 ga. | 10 ga. |
| 550 | 48" × 6' | 7 ga. | 10 ga. |
| 1,000 | 48" × 12' | 7 ga. | 10 ga. |
| 2,000 | 64" × 6' | 7 ga. | 10 ga. |
| 3,000 | 64" × 18' | 7 ga. | 10 ga. |
| 4,000 | 64" × 24' | 7 ga. | 10 ga. |
| 5,000 | 8' × 14' | 1/4" | 7 ga. |
| 6,000 | 8' × 16' | 1/4" | 7 ga. |
| 8,000 | 8' × 21' | 1/4" | 7 ga. |
| 10,000 | 8' × 27' | 1/4" | 7 ga. |
| 10,000 | 9' × 21' | 1/4" | 7 ga. |
| 12,000 | 9' × 25' | 1/4" | 7 ga. |
| 15,000 | 9' × 32' | 1/4" | 7 ga. |
| 20,000 | 10' × 34' | 1/4" | 7 ga. |
| 30,000 | 10' × 51' | 1/4" | 7 ga. |

Double wall storage tank 60 has couplings 66 mounted through secondary containment tank 62 to product storage tank 64. As in single wall storage tank 12, couplings 66 are found on the top of double wall storage tank 60, but can be located anywhere depending on the use of the tank. Double wall storage tank 60 also rests up and is supported by skid 70.

Other embodiments of the invention include a double wall multiple product tank, with double bulk heads (not shown) welded inside the primary storage tank or multiple primary storage tanks nested inside a secondary containment tank (not shown). An additional embodiment of the invention includes a single wall multiple product tank with double bulk heads (not shown) welded inside the tank.

Figure 6:
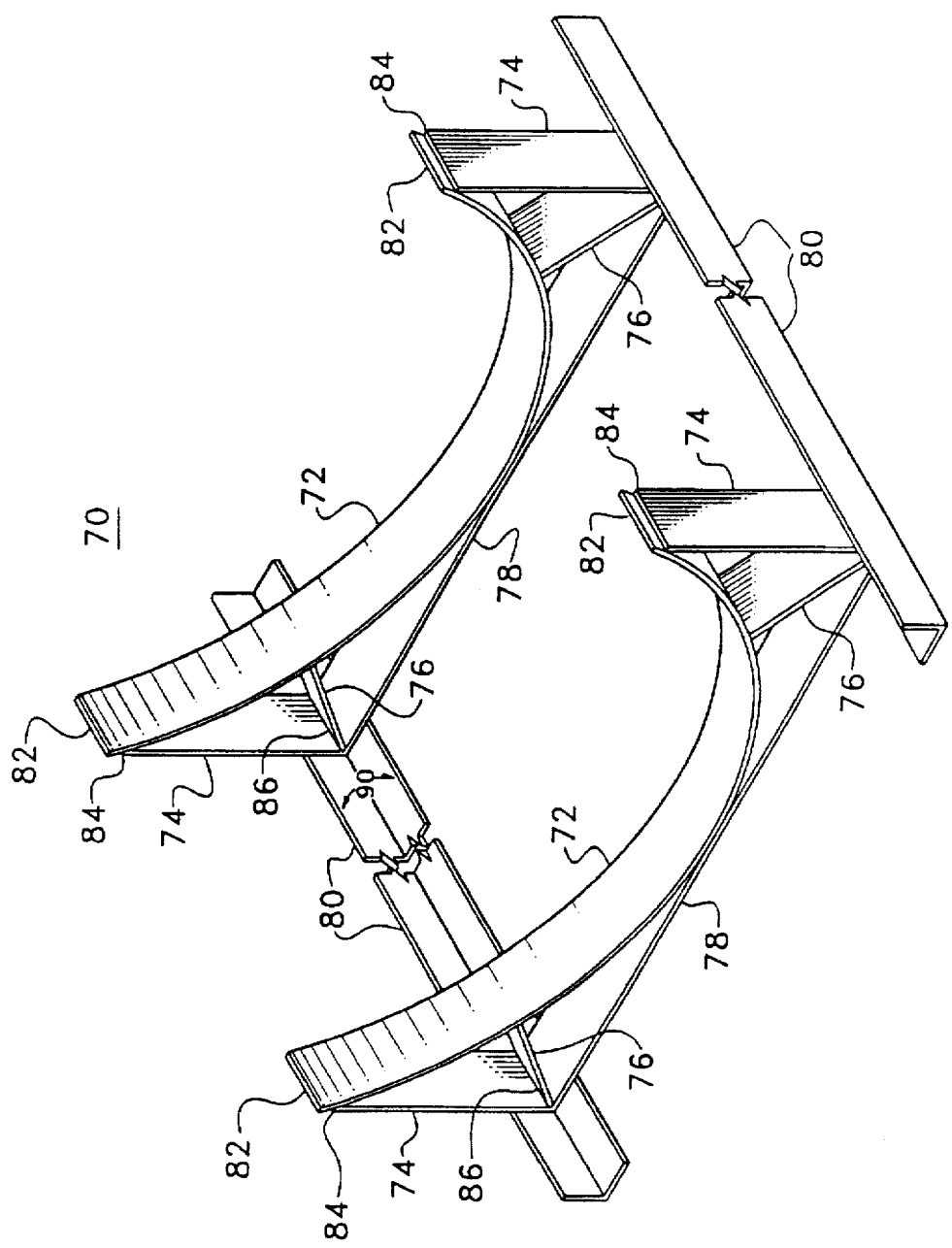
FIG. 6 illustrates a perspective view of a skid for a double wall tank.

Now referring to FIG. 6, skid 70 comprises belly bands 72, vertical support members 74, 45° support members 76, horizontal members 78, and angle member 80. Belly bands 72 are constructed of a curved band of steel that conforms to the underside of double wall storage tank 60, thus stabilizing it. Belly bands 72 have belly bands ends 82 which are supported by vertical support members 74. Vertical support members have an upper end 84 and a lower end 86. Upper end 84 is adjacent to the convex surface of belly band 72 near belly band end 82, respectively. Lower ends 86 are directly below upper ends 84 and are on the ends of horizontal member 78 at a 90° angle to horizontal member 78. Horizontal member 78 is a flat band of metal that extends between lower ends 86 of each belly band 72 and upon which the center of belly band 72 rests. Belly bands 72 are also supported by 45° support members 76. 45° support members 76 are flat bands of steel which extend at a 45° angle to horizontal member 78 and extend from lower end 86 to the convex surface of belly bands 72, respectively. To further support belly bands 72, the corner formed from vertical member 74 meeting horizontal member 78 rests in the inside angle 90 of angle support 80. An angle support 80 runs along each side of secondary containment tank 62, providing additional support to structures which support belly bands 72. Angle support 80 is illustrated with a gap to represent that angle 80 extends between belly bands 72 regardless of how far apart they are. Further, skids of other embodiments of the invention may have more than two belly bands 72 to sufficiently support longer or heavier tanks. Additionally, skid 70 performs the similar functions as skid 36.

The single wall storage tank 12 and double wall storage tank 60 are constructed per UL 142—Standard for Steel Aboveground Tanks for Flammable and Combustible Liquids. All joints are either butt weld joints 94 or joggle joints 94. Butt weld joints 96 are so named because the weld 96 fuses edges of plates that "butt" up against each other. In the present invention, a weld is made by welding both sides with a hot gas metal arc welder to ensure complete and thorough fusion. When using the hot gas metal arc welder, the gas shield is carbon dioxide. Additionally, the wire feed for the hot gas metal arc welder is an AWS E71T-1 class, titania type flux cored wire designed for use with 100% carbon dioxide gas shielding, the wire in the preferred embodiment having a typical composition of approximately 0.05% carbon and approximately 1.28% manganese. However, the wire can have a maximum of approximately 0.15% carbon and a maximum of approximately 1.4% manganese, of which excess manganese will be burnt off due to excess heat used during welding. Further, in the preferred embodiment, the wire has approximately 0.05% carbon, 1.28% manganese, 0.50% silicon, 0.013% phosphorus, and 0.009% sulfur. Further, the amperage used during welding is 180 to 220 amps. Also of importance is the relative tensile strength, yield strength, coefficient of expansion, and composition of the steel alloy in relation to the weld metal.

All the joints in tanks 12 and 60 which are not butt weld joints are joggle joints. Unlike a butt weld joint, in joggle joint, an edge overlap portion one overlaps an edge portion of another plate 112. Further, weld 120, which fuses joggle joint 94 together, is between edge 122 of plate 112 and plate 114 such that surface 124, which is on the opposite side of plates 112 and 114 from edge overlap portion 116, is substantially flat. A submerged arc welder is used to weld all joggle joints 94. Additionally, and L 61 wire is used with a 761 flux and the amperage used during welding is 225 to 280 amps.

AS per UL 142, the tank is pressure tested by soaping all the welds, observing any leaks while the tank is under pressure, and rewelding when necessary.

The present invention may be embodied in other specific forms without departing from the spirit or essential attributes thereof, and accordingly, reference should be made to the appended claims, rather than to the foregoing specification, as indicating the scope of the invention.

What is claimed is:

1. An improved above-ground fire-resistant storage tank system for storing flammable and combustible material, such as gasoline, comprising:

a plurality of storage tank sheet steel pieces assembled to form a storage tank, with each said storage tank sheet steel piece having at least one edge, each said edge being adjacent to a neighboring edge, said storage tank sheet steel pieces being approximately 10 gauge or thicker, having a maximum of approximately 0.15% carbon and a maximum of approximately 0.8% manganese, one or more joints where each said edge is in contact with said neighboring edge, said joints being selected from the group consisting of joggle joints and butt weld joints and at least one weld contains weld metal having a maximum of approximately 0.15% carbon and a maximum of approximately 1.4% manganese; and at least one tank fitting.

2. The storage tank system according to claim 1, wherein:
said storage tank sheet steel pieces having approximately 0.04% phosphorus and approximately 0.05% sulfur; and said weld metal having approximately 0.05% carbon, approximately 1.28% manganese, approximately 0.5% silicon, approximately 0.013% phosphorus, and approximately 0.009% sulfur.

3. The storage tank system according to claim 1, wherein:

said storage tank sheet steel pieces are approximately 7 gauge or thicker; and said system further comprises:

a plurality of secondary containment tank sheet steel pieces constructed to form a secondary containment tank, each said secondary containment tank sheet steel piece having at least one edge, each said edge fabricated to be adjacent to a neighboring edge, said secondary containment tank sheet steel pieces being approximately 10 gauge or thicker, having a maximum of approximately 0.15% carbon and a maximum of approximately 0.8% manganese, at least one joint where each said edge is in contact with said neighboring edge, said joint being selected from the group consisting of joggle joints and butt weld joints; and at least one weld contains weld metal having a maximum of approximately 0.15% carbon and a maximum of approximately 1.4% manganese; and said storage tank and said secondary containment tank constructed and arranged such that said storage tank can reside inside said secondary containment tank, thereby forming an interstitial space between said storage tank and said secondary containment tank.

4. The storage tank system according to claim 1, wherein:

said storage tank sheet steel pieces having approximately 0.04% phosphorus and approximately 0.05% sulfur;

said weld metal of said storage tank having approximately 0.05% carbon, approximately 1.28% manganese, approximately 0.5% silicon, approximately 0.013% phosphorus, and approximately 0.009% sulfur;

said secondary containment tank sheet steel pieces having approximately 0.04% phosphorus and approximately 0.05% sulfur; and said weld metal of said secondary containment tank having approximately 0.05% carbon, approximately 1.28% manganese, approximately 0.5% silicon, approximately 0.013% phosphorus, and approximately 0.009% sulfur.

5. A method of fabricating an improved above-ground fire-resistant storage system for storing combustible material, such as gasoline, comprising the steps of:

providing sheet steel of approximately 10 gauge or thicker, said sheet steel having a maximum of approximately 0.15% carbon and a maximum of approximately 0.8% manganese;

cutting and shaping from said sheet steel into a plurality of storage tank sheet steel pieces with at least one edge, said storage tank sheet steel pieces constructed such that when assembled and welded they form a storage tank with each said edge in contact with a neighboring edge to form at least one joint, said joint being selected from the group consisting of joggle joints and butt weld joints, at least a weld fusing each said joint;

assembling and welding said storage tank sheet steel pieces to form said storage tank, said welding being performed with a welding technique selected from the group consisting of:

submerged arc welding using a L 61 weld wire and a 761 flux, operating with 225 to 280 amps; and dual shielded wire feed welding shielded by carbon dioxide and operating with 180 to 220 amps, using a flux core weld wire having a maximum of approximately 0.15% carbon and approximately 1.4% manganese;

installing a test fitting to said continuous storage tank wall; and pressure testing said storage tank, identifying and rewelding any leaks.

6. A system made according to the method of claim 5.

7. The method according to claim 5, wherein:

said storage tank sheet steel pieces having approximately 0.04% phosphorus and approximately 0.05% sulfur; and said weld metal having approximately 0.05% carbon; approximately 1.28% manganese, approximately 0.5% silicon, approximately 0.013% phosphorus, and approximately 0.009% sulfur.

8. The method according to claim 7, wherein:

said storage tank is of a substantially cylindrical shape having a storage tank circumference and a storage tank diameter;

said cutting and shaping further comprises cutting said sheet steel such that at least one of said storage tank sheet steel pieces is a rectangular storage tank sheet having two side edges approximately equal in length to said storage tank circumference and two end edges and rolling said rectangular storage tank sheet into a storage tank ring, thereby butting said end edges;

said cutting and shaping further comprises cutting said sheet steel such that at least one of said storage tank sheet steel pieces is a storage tank end panels of substantially circular shape having a storage tank end panel diameter approximately equal to said storage tank diameter; and said assembling and welding further comprising assembling said storage tank rings and said storage tank end panels into said storage tank such that said end edges of said storage tank ring are not adjacent to said end edges of a neighboring storage tank ring.

9. A system made according to the method of claim 8.

10. The method according to claim 5, wherein:

said storage tank sheet steel pieces are approximately 7 gauge or thicker; and said cutting and shaping further comprising cutting from said sheet steel a plurality of secondary containment tank sheet steel pieces with at least one edge, said secondary containment tank sheet steel pieces constructed such that when assembled and welded they form a secondary containment tank with each said edge in contact with a neighboring edge to form at least one joint, said joint being selected from the group consisting of joggle joints and butt weld joints, at least a weld fusing each said joint;

said assembling and welding further comprising welding said secondary containment tank sheet steel pieces to form said secondary containment tank which surrounds said storage tank, thereby forming an interstitial space between said storage tank and said secondary containment tank, said welding being performed with a welding technique selected from the group consisting of:

submerged arc welding using a L 61 weld wire and a 761 flux, operating with 225 to 280 amps; and dual shielded wire feed welding shielded by carbon dioxide and operating with 180 to 220 amps, using a flux core weld wire having a maximum of approximately 0.15% carbon and approximately 1.4% manganese; and installing said tank fitting to said storage tank such that said tank fitting protrudes through said secondary containment tank wall and said storage tank and said secondary containment tank are substantially leak-free when said tank fitting is closed.

11. A system made according to the method of claim 10.

12. The method according to claim 10, wherein:

said storage tank sheet steel pieces having approximately 0.04% phosphorus and approximately 0.05% sulfur;

said weld metal of said storage tank having approximately 0.05% carbon, approximately 1.28% manganese, approximately 0.5% silicon, approximately 0.013% phosphorus, and approximately 0.009% sulfur;

said secondary containment tank sheet steel pieces having approximately 0.04% phosphorus and approximately 0.05% sulfur; and said weld metal of said secondary containment tank having approximately 0.05% carbon, approximately 1.28% manganese, approximately 0.5% silicon, approximately 0.013% phosphorus, and approximately 0.009% sulfur.

13. The method of according to claim 12, wherein:

said storage tank is of a substantially cylindrical shape, having a storage tank circumference and a storage tank diameter;

said secondary containment tank is of a substantially cylindrical shape, having a secondary containment tank circumference and a secondary containment tank diameter;

said cutting and shaping further comprises cutting said sheet steel such that at least one of said storage tank sheet steel pieces is a rectangular storage tank sheet having two side edges approximately equal in length to said storage tank circumference and two end edges and rolling said rectangular storage tank sheet into a storage tank ring, thereby butting said end edges;

said cutting and shaping further comprises cutting said sheet steel such that at least one of said secondary containment tank sheet steel pieces is a rectangular secondary containment tank sheet having two side edges approximately equal in length to said secondary containment tank circumference and two end edges and rolling said rectangular secondary containment tank sheet into a secondary containment tank ring, thereby butting said end edges;

said cutting and shaping further comprises cutting said sheet steel such that at least one of said storage tank sheet steel pieces is a storage tank end panel of substantially circular shape having a storage tank end panel diameter approximately equal to said storage tank diameter;

said cutting and shaping further comprises cutting said sheet steel such that at least one of said secondary containment tank sheet steel pieces is a secondary containment tank end panel of substantially circular shape having a secondary containment tank end panel diameter approximately equal to said secondary containment tank diameter;

said assembling and welding further comprising assembling said storage tank rings and said storage tank end panels into said storage tank such that said end edges of said storage tank ring are not adjacent to said end edges of a neighboring storage tank ring; and said assembling and welding further comprising assembling said secondary containment tank rings and said secondary containment tank end panels into said secondary containment tank such that said end edges of said secondary containment tank ring are not adjacent to said end edges of a neighboring secondary containment tank ring and said secondary containment tank surrounds said storage tank.

14. A system made according to the method of claim 13.

* * * * *